United States Patent
Walach

(10) Patent No.: US 11,287,673 B1
(45) Date of Patent: Mar. 29, 2022

(54) BROADVIEW NATURAL ADDITION LENS

(71) Applicant: Michael Walach, Largo, FL (US)

(72) Inventor: Michael Walach, Largo, FL (US)

( * ) Notice: Subject to any disclaimer, the term of this patent is extended or adjusted under 35 U.S.C. 154(b) by 0 days.

(21) Appl. No.: 17/444,186

(22) Filed: Jul. 31, 2021

Related U.S. Application Data

(63) Continuation of application No. 17/194,811, filed on Mar. 8, 2021, now Pat. No. 11,126,012.

(60) Provisional application No. 63/086,089, filed on Oct. 1, 2020.

(51) Int. Cl.
*G02C 7/06* (2006.01)

(52) U.S. Cl.
CPC .................................. *G02C 7/065* (2013.01)

(58) Field of Classification Search
CPC ........................................................ G02C 7/065
See application file for complete search history.

(56) References Cited

U.S. PATENT DOCUMENTS

| | | | |
|---|---|---|---|
| 5,777,716 A | 7/1998 | Miura | |
| 8,042,941 B2 | 10/2011 | Alonso Fernandez et al. | |
| 8,292,429 B2* | 10/2012 | Allione | G02C 7/027 351/159.42 |
| 8,684,522 B2* | 4/2014 | Kato | G02C 7/068 351/159.42 |
| 8,931,898 B2 | 1/2015 | Walach et al. | |
| 9,581,831 B2 | 2/2017 | Shinohara et al. | |
| 10,838,231 B2 | 11/2020 | Kelch et al. | |
| 2010/0085535 A1 | 4/2010 | Drobe | |
| 2011/0058143 A1 | 3/2011 | Gupta et al. | |
| 2014/0226125 A1 | 8/2014 | Fresco | |
| 2015/0338682 A1 | 11/2015 | Benoit et al. | |
| 2017/0273779 A1 | 9/2017 | Zhao | |
| 2020/0050022 A1 | 2/2020 | Spratt et al. | |
| 2020/0393702 A1 | 12/2020 | Guillot et al. | |

\* cited by examiner

*Primary Examiner* — Tuyen Tra

(74) *Attorney, Agent, or Firm* — Otterstedt, Wallace & Kammer LLP; Alan Harrison

(57) ABSTRACT

An ophthalmic lens apparatus has a visual field of a plurality of horizontal meridians each having constant optical power. The optical power of the visual field continuously varies from a top portion of the lens to a bottom portion of the lens by the horizontal meridians being arranged with their midpoints along a generally vertical focal length deceleration curve across the visual field and at least some adjacent horizontal meridians having different optical powers. widths of the horizontal meridians across the lens decrease from a top end of the focal length deceleration curve toward a bottom end of the focal length deceleration curve, and the lens surface beyond the horizontal ends of the meridians provides visual comfort to a user of the lens by providing smooth gradients of defocus without sharp edges, image jumps, waviness or distortions of image.

14 Claims, 5 Drawing Sheets

1. INFINITY GAZE
2. MID-FAR GAZE
3. FAR INTERMEDIATE GAZE
4. INTERMEDIATE GAZE
5. MID-NEAR GAZE
6. NEAR GAZE

BROADVIEW NATURAL ADDITION LENS

CROSS REFERENCE TO RELATED APPLICATION

This application is a continuation of "Broadview Natural Addition Lens," U.S. patent application Ser. No. 17/194,811, filed Mar. 8, 2021, which in turn is a non-provisional of, and claims the priority, of "Broadview Natural Addition Lens," U.S. Provisional Pat. Appl. 63/086,089, filed Oct. 1, 2020. The complete disclosures of the aforesaid U.S. patent application Ser. No. 17/194,811 and U.S. Provisional Pat. Appl. 63/086,089 are expressly incorporated herein by reference in their entireties for all purposes.

FIELD

This invention relates to the field of ophthalmic lenses.

BACKGROUND

Eyeglasses are used to treat several kinds of refractive errors (known in the field as "ametropias") suffered by human beings. Eyes that do not suffer such ametropias are said to be "emmetropic." In emmetropic eyes, images viewed by a subject focus on the subject's retina, which is a light-sensing membrane located at the back surface of the interior of the globe of the eye. Furthermore, this focus is maintained whether the subject views objects at far or near distances (the "object distance"). The focus is accomplished in part by the crystalline lens of the eye, which is a converging lens (known in the field as a "plus" power lens), located between the front surface of the eye (the "cornea") and the retina. Rays of light which emanate from objects diverge; at object distances of six meters or more, the rays that reach a subject's eyes are roughly parallel. The plus power of the crystalline lens brings these rays into focus on the retina.

As the object distance decreases, the rays that form an image in the eye increasingly include divergent rays, so that in order for an image of the object to continue to focus on the retina, the crystalline lens must change shape to increase its converging ("plus") power. This ability is called "accommodation" (or "accommodation at near"). The crystalline lens is contained within a flexible capsule, attached to the globe by the ciliary muscles, which relax when a subject views an object at a distance. This causes the crystalline lens to become more round (in cross-section; the plus power of a lens is directly related to the steepness of its curvature). However, as the crystalline lens grows, it increases in volume as a person ages, and at some point, usually around the age of forty years, the capsule in effect fills up, causing the assembly of lens and capsule to lose its flexibility. In this case, although the ciliary muscles continue to contract when a subject views a nearby object, the lens can no longer change shape adequately, confined as it is to the engorged capsule. This condition is known as "presbyopia" (from the Greek for "old eyes"), and most humans suffer from it sometime after the age of forty years.

Untreated, presbyopia manifests in subjects as a progressively diminishing ability to focus on objects at near distances. This is most often a serious problem, requiring treatment, for subjects trying to read, because reading material is almost always held at a near distance, on the order of forty centimeters. In modern times, subjects may notice a diminishing ability to see at typical object distances for computer screens (around fifty-five centimeters).

Presbyopia does not happen all at once; a subject may first notice an inability to focus at very close (i.e., close than reading) distances, or may notice difficulty reading, but still be able to see a computer screen.

Eyeglass lenses that treat presbyopia exist in the prior art. In all cases, these lenses work by affording more than one power on a single lens, so that by viewing near objects through the area of the lens that affords increased plus power, the subject can, in effect, replace the increased plus power that would, in a non-presbyopic eye, be provided by accommodation.

The "increased plus power" afforded by such lenses is referred to in the field as the "addition" (sometimes "near addition," "reading addition," or simply, "add"). Such lenses are generally known in the field as "multifocal" lenses. Existing multifocal designs can be generally categorized as "segmented" and "non-segmented," which differentiates between lenses on which the area affording the addition is visible (in which case the area is referred to as a "segment"), and those on which the area affording the addition is not visible, other than upon very close examination or measurement. In the common vernacular of the trade, "seg" is used to refer to the area affording near focus, and "add" is used to refer to both the area affording near focus, and the dioptric magnitude of the additional plus power.

With very few exceptions, whether segmented or non-segmented, the add is located on the lens below the distance area, simply because historically, near objects, especially books, are most often positioned in a subject's hands. Further, the positioning of the add must take into account the fact that our eyes converge when viewing near objects (so that both eyes point to the object).

Existing segmented designs, such as bifocals (which afford one distance power and one near power), and trifocals (which afford an intermediate power between the distance and near powers, both in terms of the physical locations of the segments and the magnitudes of the powers) having segments of various shapes and sizes, have been produced for many decades.

Non-segmented designs include "power variation" lenses, which afford multiple powers on a single lens. Subcategories of power variation lenses include "progressive power" (or simply "progressive") lenses, wherein distance and near power areas are provided, connected by a "corridor" of progressively increasing power; "degressive" lenses, which have a similar form as progressive lenses, but which are primarily intended for near and intermediate use; and "assistive" lenses, which are intended primarily for distance use, but which afford some relief for emerging presbyopes.

Existing designs have drawbacks. Many eyeglass wearers believe that segments are visible signs of advancing age, so that segmented multifocals are cosmetically undesirable. Both segmented and non-segmented designs must be fit carefully, which requires substantial skill on the part of the practitioner doing the fitting, whether the practitioner is an optician, optometrist, or in some cases, a trained clerk (i.e., not a licensed professional). Fitting includes the positioning of the segment, or of the specified fitting point (which all existing power variation lenses have) in a frame so that the features of the lens design are positioned properly in front of the subject's eyes. The accuracy of fitting is critical, and this is especially true of progressive power lenses. In the case of progressive power lenses, the fitting point must be positioned precisely in front of the subject's eyes so that as the subject views increasingly near objects, his eyes will track the progressive corridor. Because the areas of the lens on either side of the corridor are distorted, if the position of the corridor is but slightly off, either vertically or horizontally, the subject will experience distorted vision.

Currently, the fitting of multifocal lenses requires that the practitioner take three measurements. The first two are the distance between the subject's pupils at distance gaze, and at near gaze (known as the "Far P.D." and "Near P.D."; where "P.D." stands for "Pupillary Distance"). These two measurements are therefore properties of the subject's physiognomy. There are various devices designed to aid in taking this measurement, although many practitioners manage to take the measurement with a ruler. The third measurement is the "fitting height", also known as the height of the Layout Reference Point ("LRP"), and it is measured relative to the shape of the frame into which the lenses are to be fitted. This requires that the position of the LRP be measured while the patient wears the frame (which must be adjusted to fit the patient as it will ultimately be worn), from the lowest point on the lens, to a certain point on the patient. The appropriate location for this certain point on the patient varies among lens categories, but for example, in the case of progressive power lenses, it is usually the center of the pupil. Unsurprisingly, that third measurement is difficult to take and is therefore frequently inaccurate, leading to a suboptimal result for the subject, namely, the subject will not obtain comfortable vision at all object distances. There are devices which can assist in making these measurements, but they are expensive and time-consuming to use, and therefore, unpopular.

SUMMARY OF THE INVENTION

An aspect of this disclosure provides a multifocal power variation lens that provides comfortable vision at all object distances normally encountered in everyday life for the wearer of frames fitted with such lenses. More particularly, aspects of the invention provide a lens that mitigates the effects of presbyopia for the wearer of eyeglasses in which such a lens has been fitted.

Presbyopia occurs in emmetropic, myopic, and hyperopic eyes alike. (Persons who have these characteristics are referred to in the field as "emmetropes," "myopes," "hyperopes," and "presbyopes"). Embodiments of the invention advantageously treat presbyopia in all cases.

Thus, embodiments of the invention advantageously provide a new class of power variation lens, which provides more natural vision for presbyopes than existing classes of lenses, and which, by virtue of its characteristics, obviates the need to measure the height of the fitting point, thereby simplifying fitting, and increasing the likelihood of a successful fit and outcome.

Thus, one aspect of the invention provides an ophthalmic lens apparatus comprising: a visual field of a plurality of horizontal meridians each having constant optical power; wherein the optical power of the visual field continuously varies from a top portion of the lens to a bottom portion of the lens by the horizontal meridians being arranged with their midpoints along a generally vertical focal length deceleration curve across the visual field and at least some adjacent horizontal meridians having different optical powers; wherein the focal length deceleration curve follows a major design backbone of the visual field and is at least 20 millimeters (mm) long.

BRIEF DESCRIPTION OF THE DRAWINGS

The invention can be best understood by those having ordinary skill in the art by reference to the following detailed description when considered in conjunction with the accompanying drawings.

DETAILED DESCRIPTION

Reference will now be made in detail to an exemplary embodiment of the invention, which is illustrated in the accompanying drawings.

Figure 1:
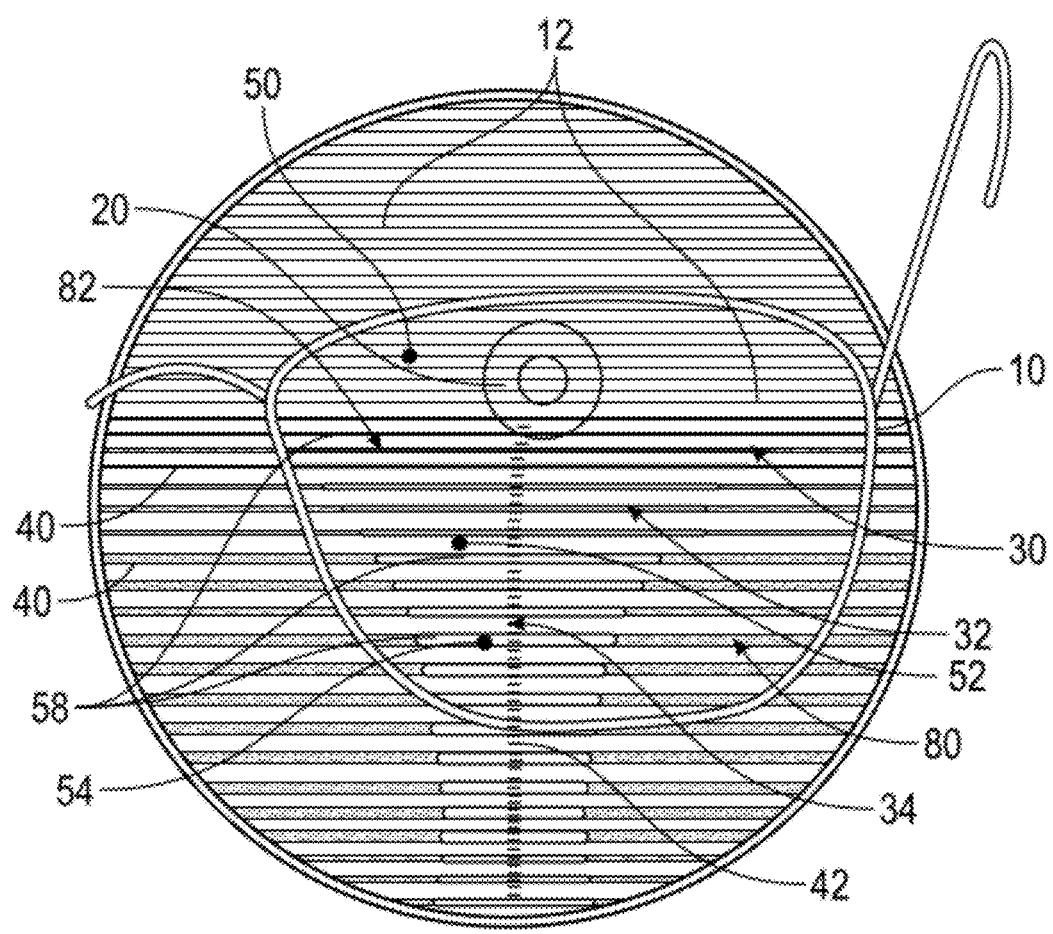
FIG. 1 depicts a broadview natural addition lens fit into a frame, and a visual field of the lens, according to an exemplary embodiment.

FIG. 1 depicts in a schematic a lens 12, according to an exemplary embodiment, as fit in a typical frame 10. A user's eye 20 is depicted in a position that typifies conventional frame fitting. Areas 30, 32, 34 on the lens include horizontal meridians 40 of differing optical power that extend from end to end across each area. Thus, at each of the meridians 40 the lens 12 has a different curvature to provide a different plus power. The meridians 40 are arranged crosswise along a generally vertical focal length deceleration curve 42 that connects the areas 30, 32, 34. The areas 30, 32, 34 are identified for viewing distant objects 50, intermediate objects 52, and near objects 54. Bars 58 have varying thicknesses that show (in approximate, relative terms) varying magnification of uniform horizontal lines when viewed through different parts of the lens 12. Portions of the bars 58 inside the areas 30, 32, 34 are clear and focused; portions of the bars 58 outside the areas 30, 32, 34 are stippled to indicate defocus. Note the bars show no discontinuity or bending. This point is reinforced by the checkerboard image shown in FIG. 5.

In a conventional progressive lens, optical power is essentially constant in an upper (distance) region and in a lower (near) region, which are connected by a relatively short "progressive corridor" of typically 7-14 mm in length and no more than about 8 mm in perceived width.

By contrast, in one or more embodiments the lens 12 has smoothly varying optical power in a visual field not less than 10 mm wide, typically about 20 mm wide, which extends along a focal length deceleration curve 42 at least 20 mm in length proceeding from about 3-10 mm below the top of frame down toward the bottom of frame. Thus, at any point along the focal length deceleration curve 42, the change in optical power according to distance along the focal length deceleration curve (the "acceleration of optical power" or "focal length deceleration rate") is sufficiently small that even a presbyopic eye can naturally without strain accommodate it within the funnel-shaped field of vision. The focal length deceleration curve 42 is generally vertical, i.e. within about 20° from vertical. In one or more embodiments the focal length deceleration curve 42 extends between about 3° and about 15° from vertical; in particular embodiments, between about 3° and about 5° from vertical. In one or more embodiments, the focal length deceleration curve 42 proceeds generally toward an inner edge of the lens from a top end of the focal length deceleration curve to a bottom end of the focal length deceleration curve. The major design backbone of the lens runs along the focal length deceleration curve 42.

Figure 2:
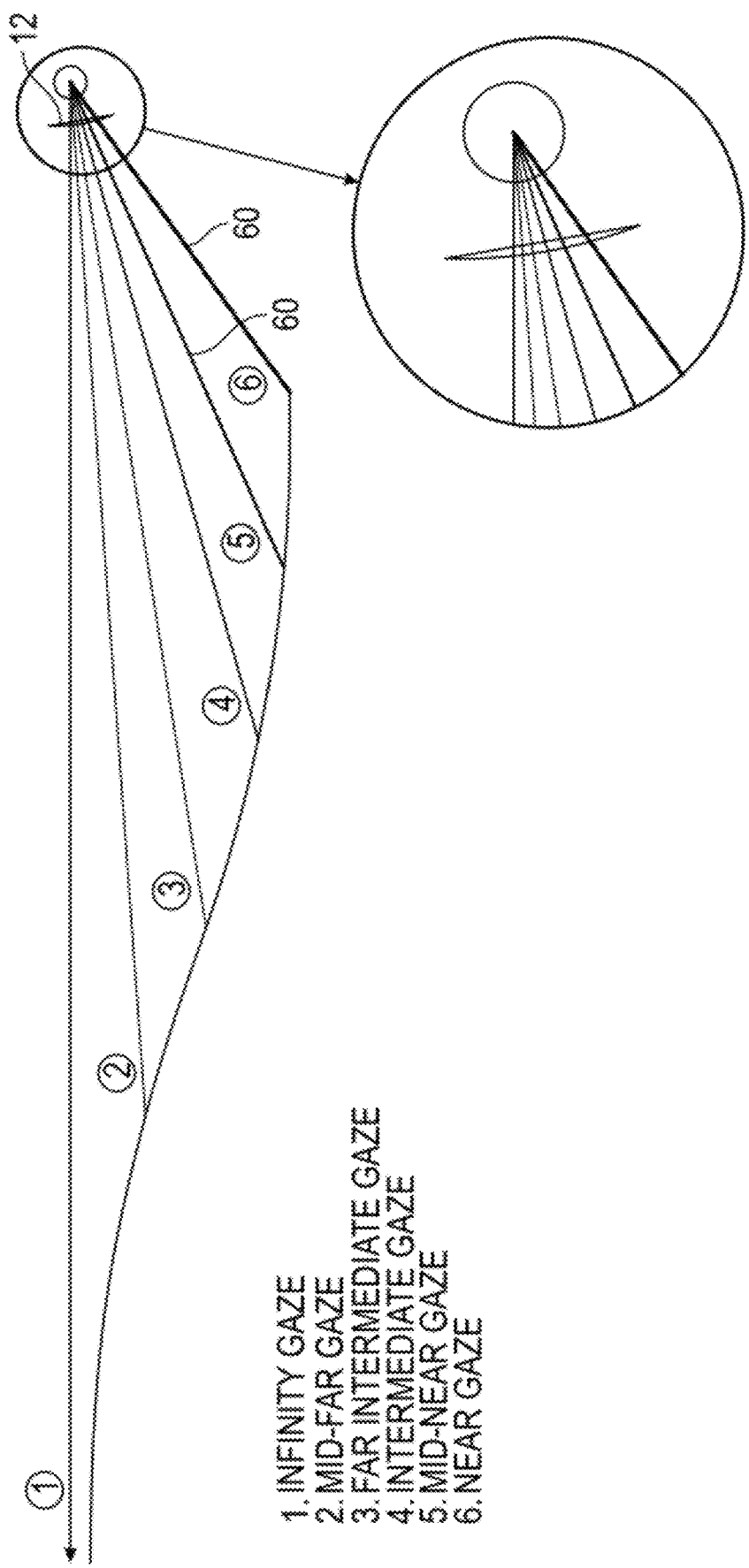
FIG. 2 depicts in a schematic a side view of the lens of FIG. 1, showing various degrees of add power for viewing objects at various distances, according to an exemplary embodiment.

Referring to FIG. 2, rays 60 show the amounts of additional plus power provided at various meridians of the lens 12 corresponding to different viewing angles (infinity gaze 1, mid-far gaze 2, far-intermediate gaze 3, intermediate gaze 4, mid-near gaze 5, or near gaze 6). The rays 60 get thicker descending the lens, corresponding to increasing add or plus power. Thus, in one or more embodiments of the present invention the meridians are stacked from distance power in the uppermost meridian to near power in the bottom meridian.

Figure 3:
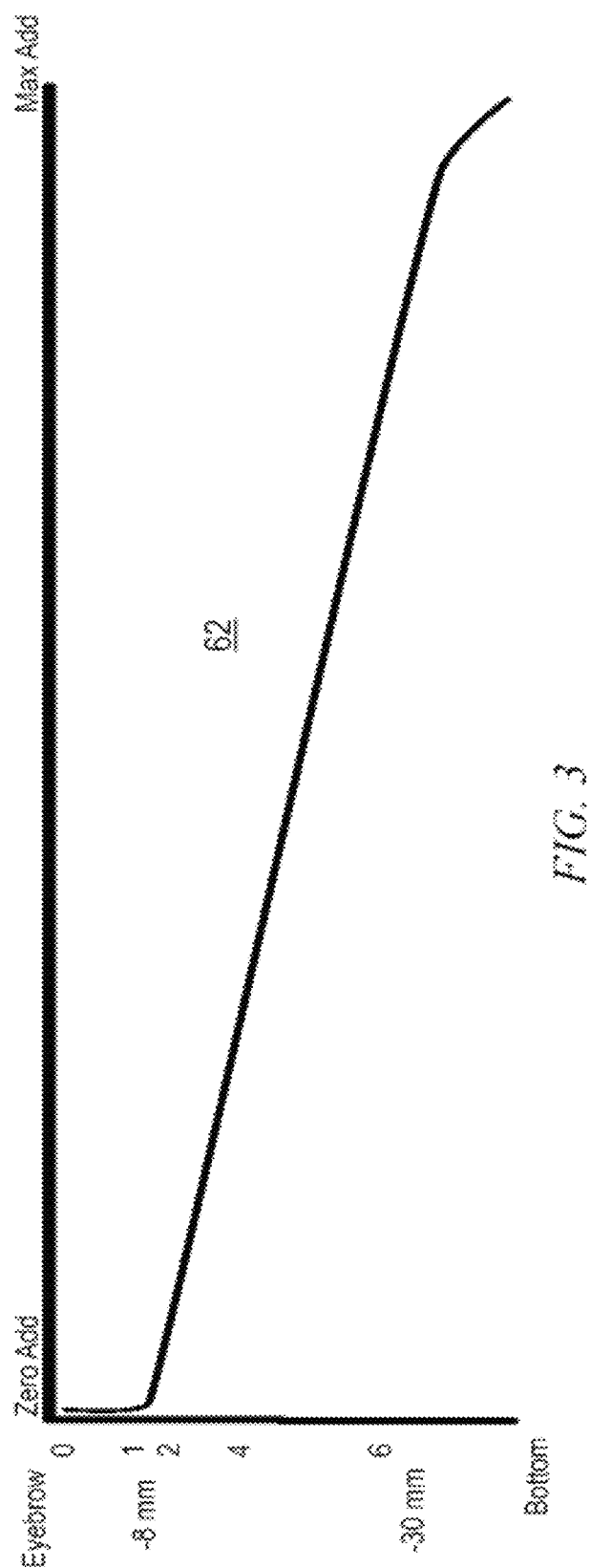
FIG. 3 depicts in a schematic a power curve of the lens of FIG. 1 at various heights along the lens surface, according to an exemplary embodiment.

A power curve 62, shown in FIG. 3, describes the increase or "acceleration" of "add" power from left (zero add) to right (full add) as the wearer's gaze descends the lens 12 from infinity gaze 1 (about 3-8 mm below the eyebrows or top of frame) toward near gaze 6 (about 30 mm below the top of frame). Note the relatively slow acceleration of add power from infinity to mid-far gaze 2, a more rapid increase of add power from mid-far gaze through intermediate gaze 4, and then again a relatively slow acceleration of add power from intermediate gaze to near gaze 6. Thus, as the wearer's gaze proceeds down the face of the lens 12, they encounter gradually decreasing curvature of the back surface. Although the increase of add power from mid-far gaze through intermediate gaze is shown as generally linear, any shape of smooth curve is suitable.

Figure 4:
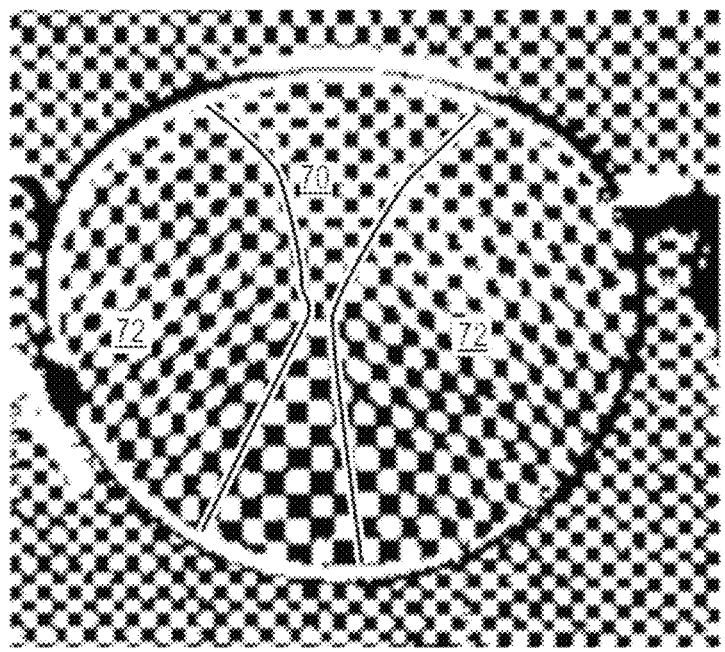
FIG. 4 depicts a prior art progressive lens fit into a frame, and a visual field of the prior art progressive lens using a checkerboard pattern.

Traditionally, as shown for example in FIG. 4 using a standard checkerboard pattern, progressive lens designs have accommodated the sharply different curvatures of near and distant fields of view by providing clear vision in an "hourglass" shape 70 with areas of astigmatism and distortion 72 to either side of the hourglass. The astigmatic areas of the lens surface induce waviness and "swim" that discomfort wearers. Unwanted or induced astigmatic lens areas are a principal reason for non-adoption of progressive lenses by presbyopes who could benefit from such lenses. Note that in the image of FIG. 4, the area of clear vision 70 and the areas of astigmatism 72 are separated by dashed lines that are not present in the original photograph. These lines are provided only for clarity of understanding.

Referring back to FIG. 1, as plus power is gradually added down the face of the lens 12, a design according to an exemplary embodiment accommodates the differing curvatures of the lens by providing areas of defocus 80 to either side of a focused field of view or "funnel" 82 that is defined by the gradually diminishing horizontal widths of the meridians 40 from top to bottom of the lens. An aspect of the invention is the discovery that the areas of defocus 80 (i.e. vision correction that is less than what the eye requires) are more tolerated by lens wearers than are the areas of astigmatism 72.

Figure 6:
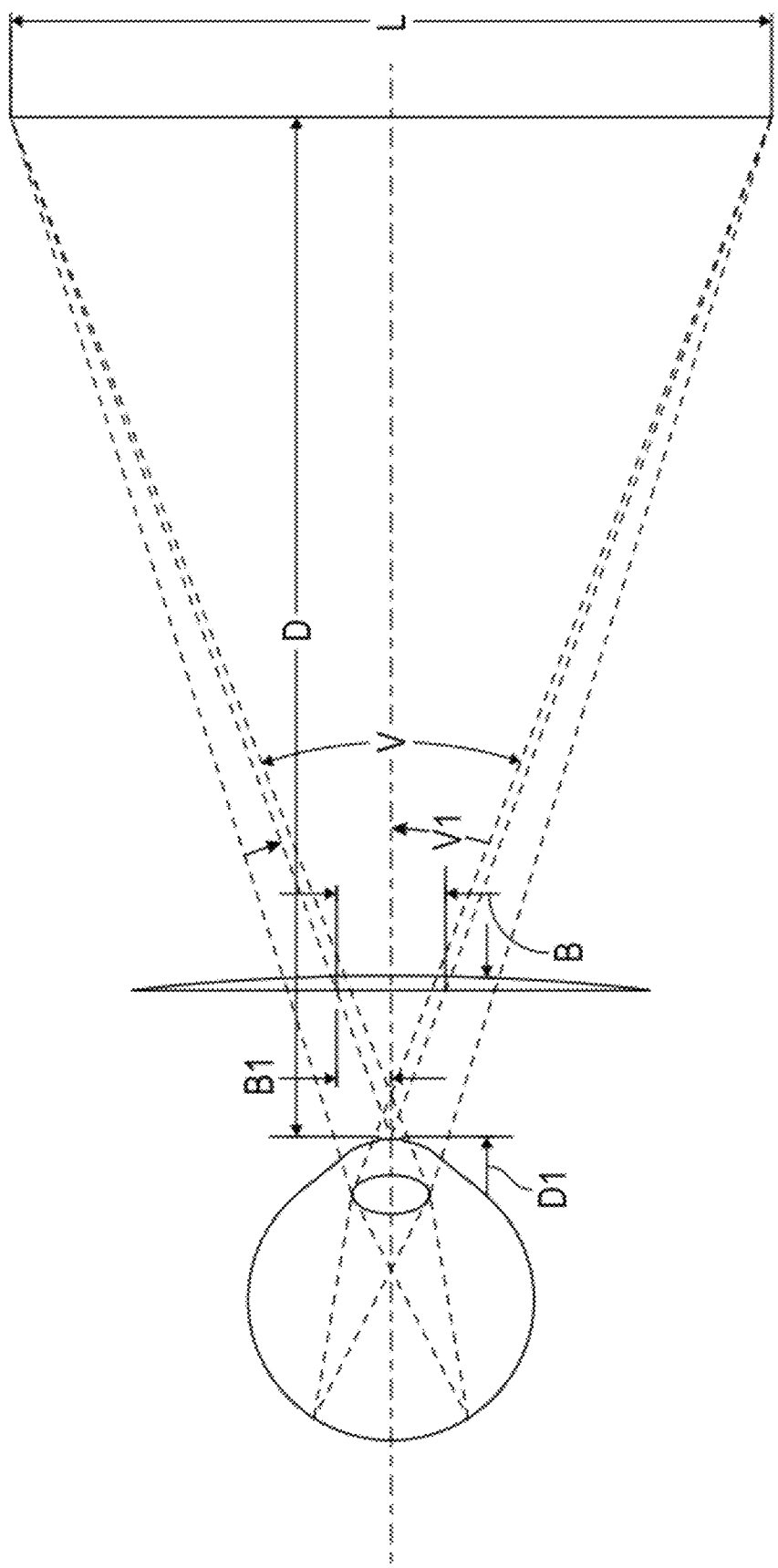
FIG. 6 depicts, in a plan view, a formula for determining widths of the visual field at various vertical positions on the lens of FIG. 1, based on common object viewing distances and sizes.

Thus, in one or more embodiments the overall field of view 82 (that is, of the stack of meridians 40 in the aggregate) has a funnel-like shape. In one or more embodiments, a minimum width of the funnel 82 at each height along the lens is defined according to the formula illustrated in FIG. 6, i.e. based on typical object dimensions L corresponding to a plurality of viewing distances D. For example:

| Viewing distance D | Typical object and L | Funnel width |
|---|---|---|
| Infinity (>6 m) | Entire field of view | Width of lens |
| Mid-near (60 cm) | Computer screen (50 cm) | 17 mm |
| Near (30 cm) | Book page (12 cm) | 15 mm |

Notably, this results in a visual field quite different from the narrow-waisted hourglass shape that typifies conventional progressive lenses.

At the horizontal edges of the funnel 82, particularly toward the outer edge of the lens, the area of defocus 80 that widens from top to bottom of the lens enables smooth transitions between the adjacent meridians 40, without sharp edges or jumps between the meridians. The widening defocus also enables smooth power gradients at the ends of the meridians 40, without sharp edges or image jumps between the meridians and the area of defocus 80. An aspect of the invention is the new understanding that human vision is more tolerant of defocus than of image jump or astigmatism, and that attempts to minimize areas of defocus, according to conventional wisdom of lens design, are counterproductive at least because such attempts promote large areas of astigmatism, which many lens wearers find discomforting in daily vision.

Figure 5:
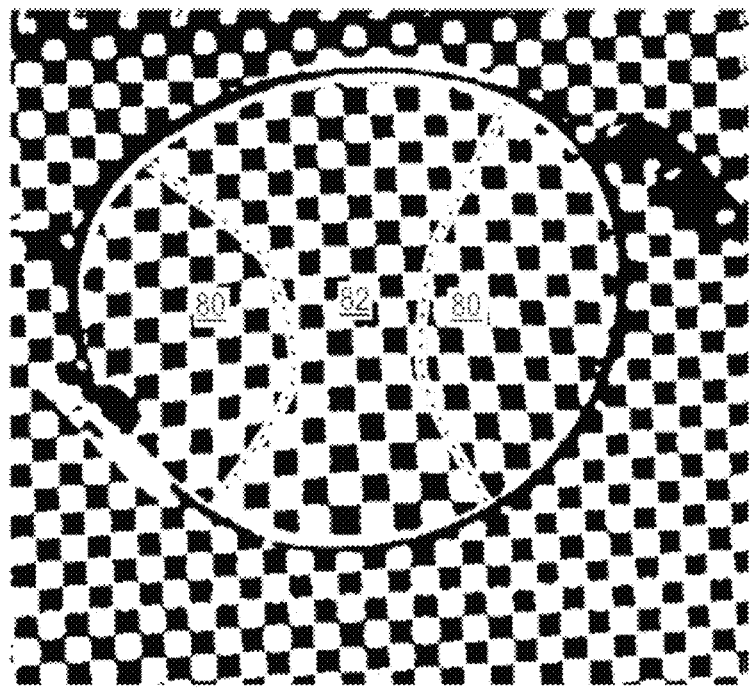
FIG. 5 depicts the lens of FIG. 1 fit into a frame, and a visual field of the lens using a checkerboard pattern.

FIG. 5 depicts experimental results according to an exemplary embodiment, using a conventional checkerboard pattern to highlight the different regions of the lens 12. In the areas of defocus 80 the checkerboard pattern is not significantly distorted, but is somewhat blurry. In the funnel 82, the checkerboard pattern is clearly focused and not distorted throughout the length of the focal length deceleration curve 42. This is by contrast to the conventional progressive lenses as illustrated by example in FIG. 4. Note that in the image of FIG. 5 the "funnel" 82 is separated from the areas of defocus 80 by a dashed line that is not present in the original photograph. This line is provided only for clarity of understanding.

Thus, FIG. 1, FIG. 2, FIG. 3, and FIG. 5 together illustrate:
1. continuous addition of power across the height of the lens, rather than any "corridor" as found in progressive power lenses;
2. meridians of various additional plus powers;
3. a broad field of view;
4. areas of defocus rather than any undulating power changes at the edges of the field of view.

In one aspect of the invention, a broadview lens for mitigating presbyopia includes multiple meridians of differing optical powers. Such a lens provides significant advantages over progressive power lenses, which employ designs using a relatively narrow corridor of continuously increasing power; the corridor of a progressive lens connects an area in the upper part of the lens, which affords a power intended for viewing objects at far object distances (i.e., six meters or greater, referred to in the field as "far" or "distance" vision) with an area in the lower part of the lens, which affords a power intended for viewing objects at near object distances (i.e., thirty to forty centimeters, referred to in the field as "near" vision). While a lens according to an exemplary embodiment of this disclosure also provides areas for far and near object distances, these areas incorporate continuously varying meridians of optical power that reduce distortions at the edges of the lens.

At each meridian, the acceleration of optical power with respect to vertical distance is controlled so as to minimize undesirable effects that a subject wearer might otherwise perceive, such as defocus, distortion, or "swim." Furthermore, the shape of the surface in each meridian is designed in such a way as to be coordinated with surrounding meridians, in other words with no perceptible line between meridians, so as to eliminate any sensation on the part of the subject as his or her eyes transition from one meridian to the next. However, along each horizontal meridian 40 within the funnel 82, the lens is constant in optical power to the extent this is feasible by modern manufacturing techniques.

Within each meridian, the width of the field of view (that is, the area of clear vision or funnel 82) diminishes from the top to the bottom. The curvature of the surface is adjusted, according to conventional techniques, to eliminate any abrupt lateral power change. This introduces the areas of defocus 80 at horizontal ends of the power meridians, but advantageously reduces or eliminates the waviness that plagues progressive power lenses.

In certain embodiments of the present invention, the shape of the frame into which the lens is to be fitted is taken into consideration in the designs of the meridians, so that the uppermost meridian provides a field of view as wide as the frame. Furthermore, the position of the meridians in the frame is established to facilitate a sensation of natural vision when viewing objects at common distances, as shown in FIG. 2. For example, in one or more embodiments the focal length deceleration curve 42 is arranged consistent with the natural lateral convergence of eyes from infinity gaze toward near gaze. This eliminates any need to measure the height of the patient's pupil in the frame as normally positioned for wear.

Other embodiments, having other configurations of meridians, are possible. For example, having intermediate power meridians at the top of a lens, distance meridians a little further down, and intermediate and near meridians toward the bottom, is a useful configuration for pilots, who must be able to view controls above their heads as well as the controls below their shoulders and the distant planes ahead of them.

Preferably, a design for a lens according to an exemplary embodiment is produced by a lens design system capable of processing multiple independent visual fields, e.g., one visual field for each bundle of meridians or area of the lens.

Given the foregoing description and in view of the accompanying drawings, it will be appreciated that one aspect of the invention provides an ophthalmic lens apparatus 12, which includes a visual field 82 of a plurality of horizontal meridians 40 each having constant optical power. The optical power of the visual field 82 continuously varies from a top portion 30 of the lens to a bottom portion 34 of the lens by the horizontal meridians being arranged with their midpoints along a generally vertical focal length deceleration curve 42 that extends across the height of the visual field and at least some adjacent horizontal meridians having different optical powers. The focal length deceleration curve 42 follows a major design backbone of the visual field and is at least 20 millimeters (mm) long.

In one or more embodiments, widths of the horizontal meridians 40 across the lens 12 decrease from a top end of the focal length deceleration curve 42 toward a bottom end of the focal length deceleration curve. In one or more embodiments, widths of the horizontal meridians near a midpoint of the focal length deceleration curve are no less than 15 mm. In one or more embodiments, widths of the horizontal meridians at a portion of the focal length deceleration curve corresponding to a mid-near gaze are no less than 15 mm.

In one or more embodiments, the lens surface beyond the horizontal ends of the meridians 40 provides visual comfort to a user of the lens by providing smooth gradients of defocus 80 without sharp edges, image jumps, waviness or distortions of image.

In one or more embodiments, each meridian 40 proceeding along the focal length deceleration curve 42 from a top end toward a bottom end has a shorter focal length than a preceding adjacent meridian. In one or more embodiments, differences in focal length between adjacent meridians are greater toward a midpoint of the focal length deceleration curve than toward either the top end or the bottom end. In one or more embodiments, a difference in focal length between meridians along a 1 mm length of the focal length deceleration curve is no greater than 0.25 Diopter in total. In one or more embodiments, adjacent meridians are spaced apart along the focal length deceleration curve by no more than 0.1 mm. In one or more embodiments, the focal length deceleration curve is about 30 mm long.

In one or more embodiments, the focal length deceleration curve extends within about 20° from vertical. In one or more embodiments, the focal length deceleration curve extends between about 3° and about 15° from vertical. In one or more embodiments, the focal length deceleration curve extends between about 3° and about 5° from vertical. In one or more embodiments, the focal length deceleration curve proceeds generally toward an inner edge of the lens from a top end of the focal length deceleration curve to a bottom end of the focal length deceleration curve.

In one or more embodiments, the top end of the focal length deceleration curve is at least 3 mm below a top edge of the lens.

A lens designer will understand, from the foregoing description, the system and method as described and many of its attendant advantages. It will be apparent to the ordinary lens designer that various changes may be made in the form, construction, and arrangement of the components thereof without departing from the scope and spirit of the invention or without sacrificing all of its material advantages. Equivalent elements can be substituted for the ones set forth above such that they perform in substantially the same manner in substantially the same way for achieving substantially the same result. The form herein described being merely an exemplary and explanatory embodiment of the invention, the following claims intend to encompass and include all equivalent variations of this disclosure.

What is claimed is:

1. An ophthalmic lens apparatus comprising:
    a visual field of a plurality of horizontal meridians each having constant optical power;
    wherein the optical power of the visual field continuously varies from a top portion of the lens to a bottom portion of the lens by the horizontal meridians being arranged with their midpoints along a generally vertical focal length deceleration curve that extends across the height of the visual field and by at least some adjacent horizontal meridians having different optical powers;
    wherein widths of the horizontal meridians across the lens decrease from a top end of the focal length deceleration curve toward a bottom end of the focal length deceleration curve, and the lens surface beyond the horizontal ends of the meridians provides visual comfort to a user of the lens by providing smooth gradients of defocus without sharp edges, image jumps, waviness or distortions of image.

2. The apparatus of claim 1, wherein the focal length deceleration curve follows a major design backbone of the visual field and is no less than 14 millimeters (mm) long.

3. The apparatus of claim 2, wherein widths of the horizontal meridians near a midpoint of the focal length deceleration curve are no less than 8 mm.

4. The apparatus of claim 3, wherein widths of the horizontal meridians near a portion of the focal length deceleration curve corresponding to a mid-near gaze are no less than 15 mm.

5. The apparatus of claim 1, wherein each meridian proceeding along the focal length deceleration curve from a top end toward a bottom end has a shorter focal length than a preceding adjacent meridian.

6. The apparatus of claim 5, wherein differences in focal length between adjacent meridians are greater toward a midpoint of the focal length deceleration curve than toward either the top end or the bottom end.

7. The apparatus of claim 1, wherein a difference in focal length between meridians along a 1 mm length of the focal length deceleration curve is no greater than 0.25 Diopter in total.

8. The apparatus of claim 1, wherein adjacent meridians are spaced apart along the focal length deceleration curve by no more than 0.1 mm.

9. The apparatus of claim 1, wherein the focal length deceleration curve is about 30 mm long.

10. The apparatus of claim 1, wherein the focal length deceleration curve extends within about 20° from vertical.

11. The apparatus of claim 10, wherein the focal length deceleration curve extends between about 3° and about 15° from vertical.

12. The apparatus of claim 11, wherein the focal length deceleration curve extends between about 3° and about 5° from vertical.

13. The apparatus of claim 10, wherein the focal length deceleration curve proceeds generally toward an inner edge of the lens from a top end of the focal length deceleration curve to a bottom end of the focal length deceleration curve.

14. The apparatus of claim 1, wherein the top end of the focal length deceleration curve is at least 3 mm below a top edge of the lens.

* * * * *